US008387325B2

(12) United States Patent
Mullet et al.

(10) Patent No.: US 8,387,325 B2
(45) Date of Patent: Mar. 5, 2013

(54) INSULATED SIDING APPARATUS

(75) Inventors: William Mullet, Sugarcreek, OH (US); Clinton Anderson, Cincinnati, OH (US); Donald Harris, Booneville, MS (US); Ron Wierzbicki, Plymouth, MI (US); Chris Wren, Booneville, MS (US)

(73) Assignee: Provia Products, Sugarcreek, OH (US)

( * ) Notice: Subject to any disclaimer, the term of this patent is extended or adjusted under 35 U.S.C. 154(b) by 62 days.

(21) Appl. No.: 12/719,319

(22) Filed: Mar. 8, 2010

(65) Prior Publication Data

US 2011/0214372 A1 Sep. 8, 2011

(51) Int. Cl.
*E04D 1/00* (2006.01)

(52) U.S. Cl. ........................................ 52/526; 52/539

(58) Field of Classification Search ................. 52/309.1, 52/506.01, 539, 508, 409, 586.1, 518, 309.8, 52/592.1, 519, 520, 546, 555

See application file for complete search history.

(56) References Cited

U.S. PATENT DOCUMENTS 3,159,943 A 12/1964 Sugar et al.
3,552,078 A * 1/1971 Mattes ............................ 52/520
3,605,369 A 9/1971 Merrill et al.
3,826,054 A 7/1974 Culpepper, Jr.
3,998,021 A 12/1976 Lewis
4,033,802 A 7/1977 Culpepper, Jr. et al.
4,034,528 A 7/1977 Sanders et al.
4,081,939 A 4/1978 Culpepper, Jr. et al.
4,320,613 A 3/1982 Kaufman
4,327,528 A 5/1982 Fritz
4,400,918 A * 8/1983 Lewis ............................... 52/98
4,586,304 A 5/1986 Flamand
4,767,581 A 8/1988 Tippmann
4,788,808 A 12/1988 Slocum
4,828,635 A 5/1989 Flack et al.
4,864,788 A 9/1989 Tippmann
4,969,302 A 11/1990 Coggan et al.
5,134,831 A 8/1992 Avellanet
5,204,176 A * 4/1993 Seiss et al. ................. 428/304.4
5,425,210 A * 6/1995 Zafir ............................ 52/404.4
5,878,543 A 3/1999 Mowery
6,029,415 A 2/2000 Culpepper et al.
6,195,952 B1 3/2001 Culpepper et al.
6,253,511 B1 * 7/2001 Boyer .......................... 52/302.4
6,298,626 B2 * 10/2001 Rudden ........................... 52/520
6,321,500 B1 11/2001 Manning et al.
6,516,572 B1 2/2003 Nowacek et al.
6,526,718 B2 3/2003 Manning et al.
6,682,814 B2 1/2004 Hendrickson et al.
6,863,972 B2 3/2005 Burger et al.
6,952,901 B2 10/2005 Jacques et al.

(Continued)

*Primary Examiner* — Joshua J Michener
*Assistant Examiner* — Keith Minter
(74) *Attorney, Agent, or Firm* — McDonald Hopkins LLC

(57) ABSTRACT

An insulated siding member and a method of fabricating an insulating siding member is described. The siding member may include a siding panel, an insulation member and a backing layer. The siding panel may have a cavity that may serve as a molding receptacle to allow the insulating material to be molded directly into the cavity of the remainder of the siding panel. The cavity may also allow for the insulation layer to be applied directly to the panel, whereby there may be no need for an additional adhesive layer to attach the insulation member with the siding panel. Thus, the backing layer may be attached directly to the insulation member. The siding member may have a configuration that may also allow the siding member to be easily engaged with or be interlocked with another siding member to provide for better and more uniform insulation.

21 Claims, 4 Drawing Sheets

U.S. PATENT DOCUMENTS 6,968,659 B2 * 11/2005 Boyer .......................... 52/302.4
7,007,433 B2 3/2006 Boyer
7,040,067 B2 5/2006 Mowery et al.
7,188,454 B2 3/2007 Mowery et al.
7,467,500 B2 12/2008 Fairbanks et al.
7,712,276 B2 * 5/2010 Gilbert et al. ................... 52/529
7,934,352 B1 * 5/2011 Mollinger et al. ........... 52/748.1
7,954,292 B2 * 6/2011 Holt et al. .................... 52/309.8
2002/0014051 A1 * 2/2002 Fraval et al. ................. 52/794.1
2003/0131551 A1 * 7/2003 Mollinger et al. .............. 52/518
2004/0247022 A1 12/2004 Raghavan et al.
2005/0081468 A1 * 4/2005 Wilson et al. ................... 52/528
2005/0097858 A1 5/2005 Miedzianowski et al.
2005/0247022 A1 11/2005 Poupart et al.
2006/0037268 A1 2/2006 Mahaffey
2006/0042183 A1 3/2006 Benes
2006/0075712 A1 4/2006 Gilbert et al.
2006/0185299 A1 * 8/2006 Poupart ........................... 52/545
2006/0272257 A1 12/2006 Hobbie
2007/0009688 A1 1/2007 Haque et al.
2007/0011976 A1 1/2007 Mowery et al.
2007/0175154 A1 8/2007 Wilson et al.
2007/0193177 A1 8/2007 Wilson et al.
2007/0212970 A1 9/2007 Rockwell et al.
2007/0261353 A1 11/2007 Cullen
2008/0000176 A1 * 1/2008 Mandelzys et al. ............. 52/272
2008/0236080 A1 10/2008 Heatherly
2008/0295430 A1 12/2008 Lewis
2009/0038249 A1 2/2009 Coulton et al.
2009/0042471 A1 2/2009 Cashin et al.
2009/0062431 A1 * 3/2009 Nasr et al. ......................... 524/8
2009/0113831 A1 5/2009 DeWildt et al.
2009/0145065 A1 6/2009 Hartman
2010/0175341 A1 * 7/2010 Gilbert et al. ................ 52/302.1
2010/0281801 A1 * 11/2010 Shaw et al. .................. 52/302.1

* cited by examiner 10
12
14
16

42
30
46
38
22
44
32
40
48
28
36
26

INSULATED SIDING APPARATUS

FIELD OF INVENTION

The present invention generally relates to siding and, more particularly, to an insulated siding apparatus or member.

BACKGROUND

Siding is commonly used to cover the exterior surfaces or walls of structures, such as buildings. The siding has typically been fabricated out of ductile metals, such as aluminum, or thermoplastic materials, such as polyvinyl chloride (PVC).

The siding may be formed with one or more sections or courses. Any appropriate number of these courses may often be combined together with horizontal shoulders to form a siding profile. The courses may be downwardly extending sections.

Such siding may typically be installed in multiple rows of siding panels, whereby each row may overlap the adjacent panels. Overlapping the adjacent panels may provide additional protection to the structure from the elements, such as wind, rain, snow and the like. The siding fabricated out of PVC or metal, however, may have very little insulative properties.

To enhance the thermal insulation of building structures, it is common to provide a layer of insulating material between the siding and the building wall or structure. Siding panels may be utilized with insulation panels or layers. The insulation panels may be positioned behind the siding panel and between the siding panel and the structure to increase the insulative properties of the siding. The insulation panels may be fabricated out of a foamed polymeric material, such as expanded polystyrene (EPS), and may be secured to the siding panel with an adhesive.

The insulation panel or layer may both inhibit the transfer of heat across the wall of the structure and also provide support for the siding panel. While utilizing an insulation panel with the siding panel may increase the insulative properties of the siding, there may still be small spaces without insulation or air gaps within the siding. This problem may be further aggravated depending on the type of adhesive used and/or method of applying such adhesive.

In addition, there may be potential leakage problems where the siding panels are joined and/or nailed together, such as a lack of insulation. Because of the flat shapes of the present siding panels, they may not be acceptable for use as molding cavities for processing or fabricating liquid or foam type insulation onto the rear of the siding panel. Since present siding panels lack a cavity suitable for insulation mounting, the only type of insulation that can be added to the present siding panels is pre-cut and pre-formed polystyrene that is attached to the siding panel with an additional adhesive layer.

Thus, current siding panels require the additional adhesive layer to secure the siding panel to the pre-cut and pre-formed insulation layer. There may also be problems related to limited insulation of a polystyrene backing layer to the siding panel.

SUMMARY

An insulated siding member and a method of fabricating an insulating siding member is described. The siding member may include a siding panel, an insulation panel and a backing layer. The siding panel may have a cavity that may serve as a molding receptacle to allow the insulating material to be molded directly into the cavity of the remainder of the siding panel. The cavity may also allow for the insulation layer to be applied directly to the panel, whereby there may be no need for an additional adhesive layer to attach the insulation panel with the siding panel. Thus, the backing layer may be attached directly to the insulation panel. The siding member may have a configuration that may also allow the siding member to be easily engaged with or be interlocked with another siding member to provide for better and more uniform insulation.

DESCRIPTION OF THE DRAWINGS

Objects and advantages together with the operation of the invention may be better understood by reference to the following detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

Figures 1, 2:
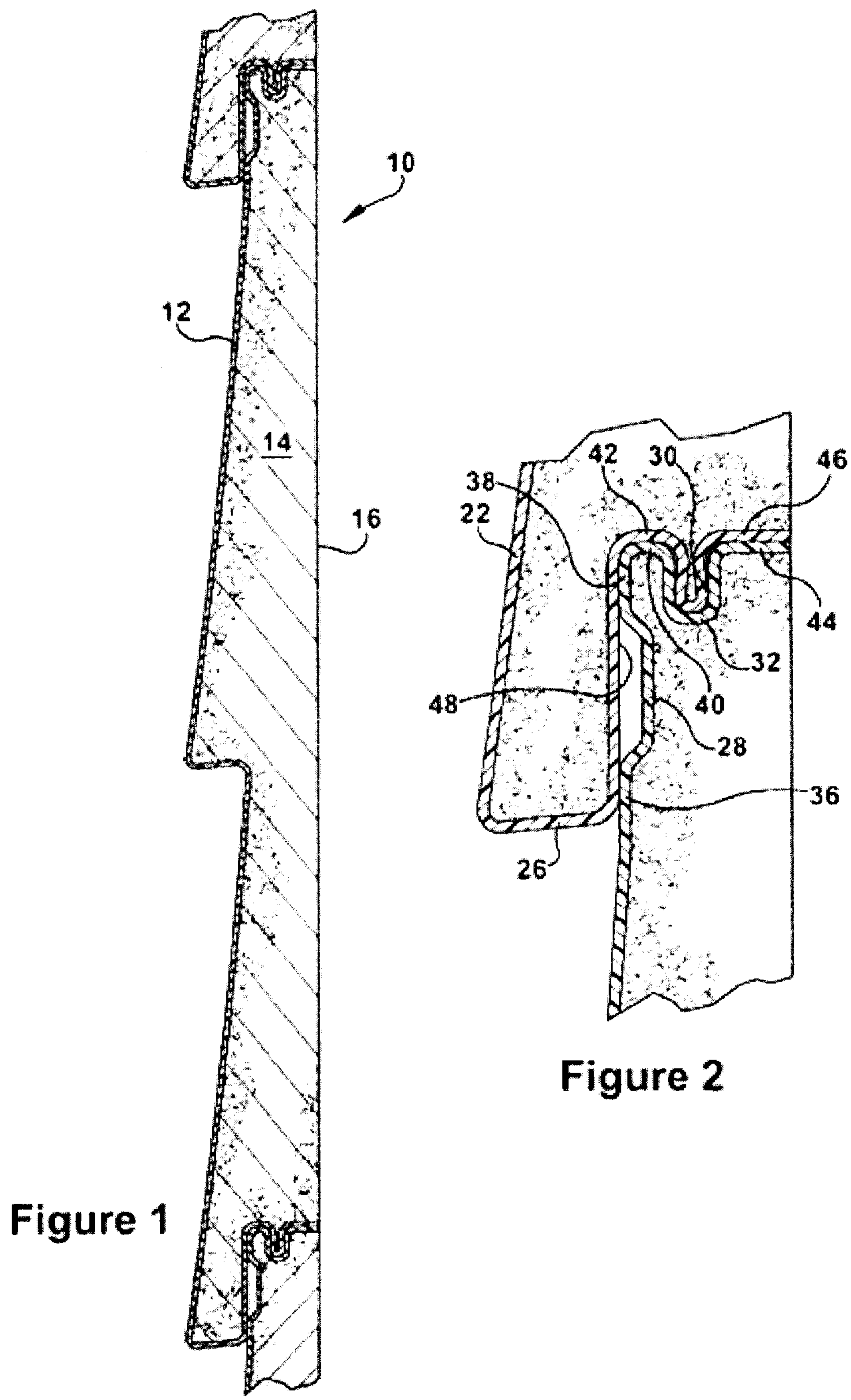
FIG. 1 illustrates a side view of a first siding member in a locked engagement with a second siding member.
FIG. 2 illustrates a close up detailed view of the locking components of the two siding panels of FIG. 1.
Figure 4:
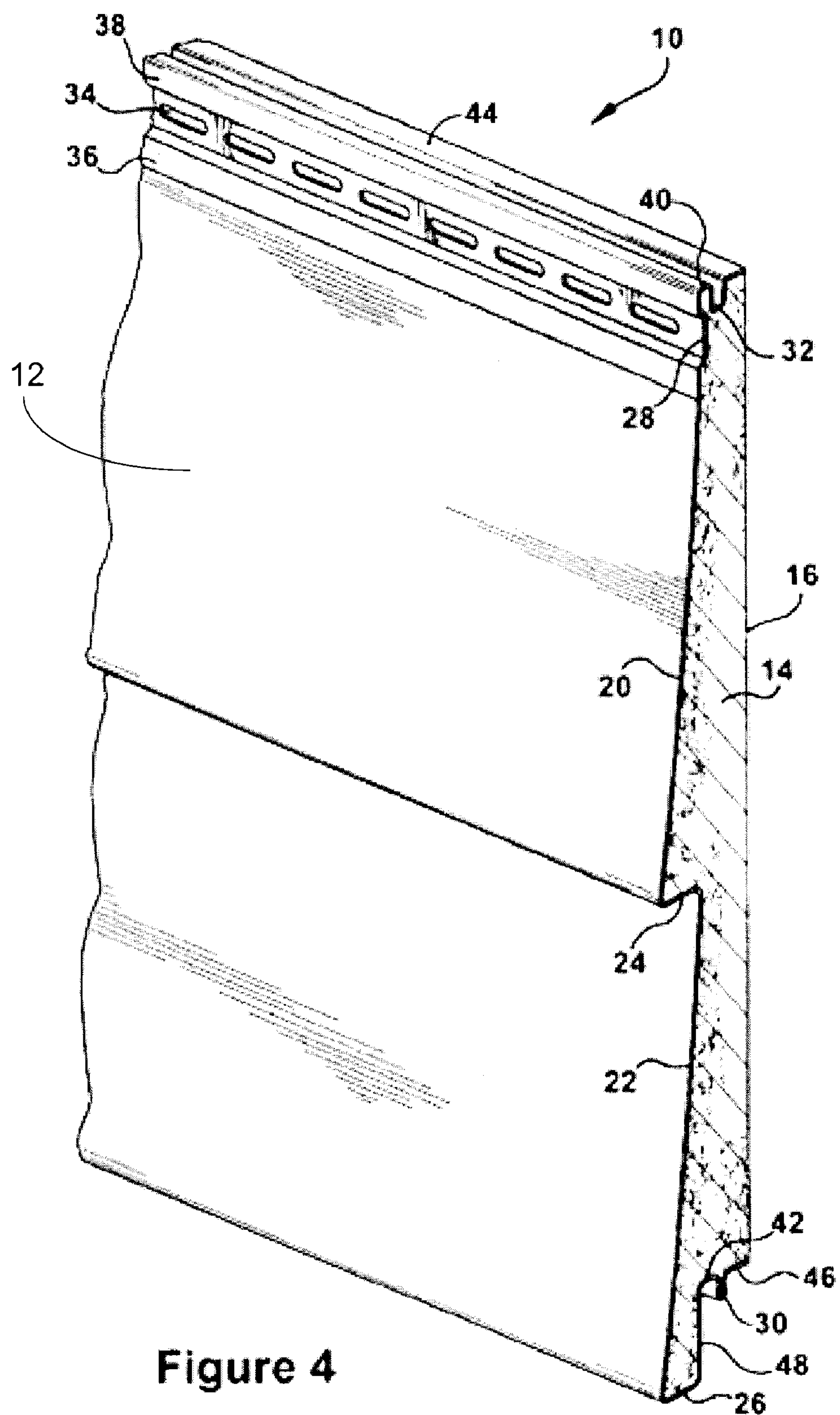
FIG. 4 illustrates a perspective view of the siding member of FIG. 1.

An insulated siding apparatus or member 10 is illustrated in FIGS. 1, 2, 4 and 5. The insulated siding member 10 may be utilized to provide exterior wall cladding for a building or structure (not shown). The siding member 10 may be fabricated out of any appropriate type of materials and may be fabricated by any appropriate type of process(es). The insulated siding member 10 may include a siding panel 12, an insulation member 14 and a backing or film layer 16 (FIGS. 1 and 4).

The siding panel 12 may be fabricated out of any appropriate type of material(s) and may be fabricated by any appropriate process(es), such as an extruded composite siding panel 12. For example, the siding panel 12 may be fabricated out of a vinyl composite, such as acrylonitrile-styrene-acrylate (ASA), acrylic, fiberglass reinforcement, Thermoplastic Polyurethane Elastomers (TPU) and Polyurethane-Polyurea Elastomers or the like. The siding panel 12 may be a non-brittle and light weight panel. For example, the siding panel 12 may be lighter than fiber cement siding. In addition, the siding panel 12 may be of any appropriate or desired color and/or texture.

The siding panel 12 may be of any appropriate shape or size. For example, the siding panel 12 may be of a shape and configuration that may be stackable when assembled together, such as on the exterior of the structure to be sided, whereby one siding panel 12 may be stacked upon another siding panel 12 and so on to cover the desired area (FIGS. 1 and 2).

The siding panel 12 may include at least one course 20, at least one shoulder 24, and an attachment channel 28 (FIGS.

3-5). The siding panel 12 may utilize any appropriate number of courses, such as two courses 20, 22. For example, there may be one, two, three, etc. courses utilized with the siding panel 12. The courses 20, 22 may be of any appropriate shape or size, such as a generally triangular, rectangular or square shape. Also, the courses 20, 22 may be planar or curved in shape. The courses 20, 22 may be located at any appropriate position on the siding panel 12. For example, the courses 20, 22 may be located one upon the other, whereby one may be an upper course 20 and the other may be a lower course 22 (FIG. 3).

Figure 3:
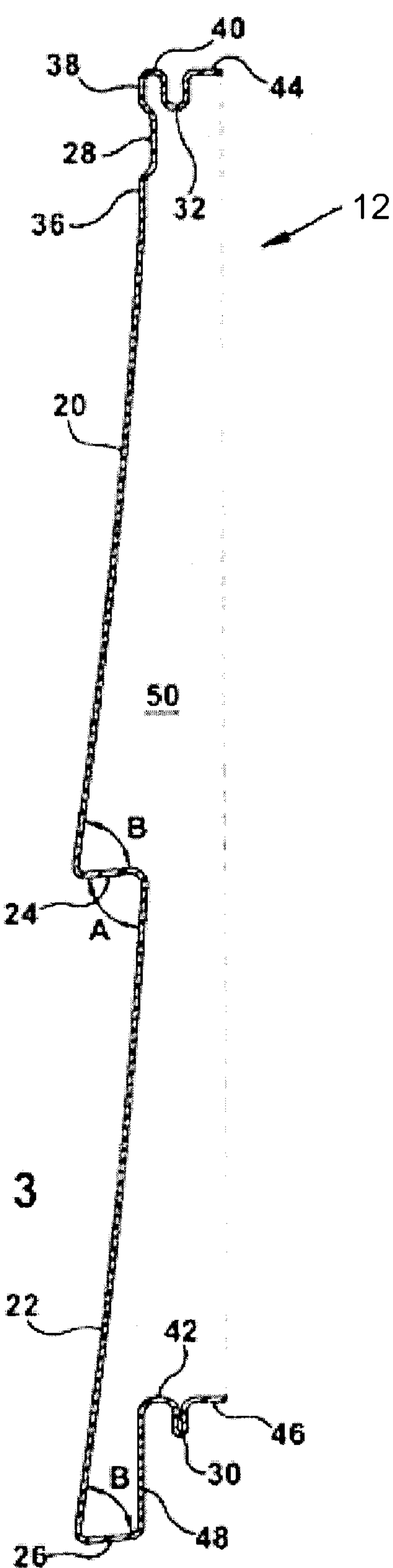
FIG. 3 illustrates a side view of a siding panel.

The upper course 20 may include a generally planar section 36 (FIGS. 3 and 4). The planar section 36 may be of any appropriate shape or size, such as a generally rectangular shape. The planar section 36 may also be substantially planar. The planar section 36 may be located at any appropriate position on the upper course 20, such as towards an upper end of the upper course. For example, the planar section 36 may be located at an end opposite that of the shoulder 24, whereby the upper course 20 may span the distance between the planar section 36 and shoulder 24 (FIGS. 3 and 4). The upper course 20 may extend outward at a slight angle from the planar section 36.

The siding panel 12 may utilize any appropriate number of shoulders, such as two shoulders 24, 26 (FIGS. 3 and 4). The shoulders 24, 26 may be of any appropriate shape or size, such as a generally triangular, rectangular or square shape. The shoulders 24, 26 may also be planar or curved in shape. The shoulders 24, 26 may be located at any appropriate position on the siding panel 12, such as being located adjacent and below the courses 20, 22, whereby one may be an upper shoulder 24 and the other may be a lower shoulder 26. For example, the shoulder 24 may be located between the upper course 20 and the lower course 22. In addition, the lower course 22 may be located and span the distance between the upper shoulder 24 and the lower shoulder 26.

The upper shoulder 24 may be located at an angle A from the lower course 22 (FIG. 3). The angle A may be any appropriate angle, such as generally less than about 90 degrees. The upper course 20 may also be located at a complementary angle B from the shoulder 24. The angle B may be any appropriate angle, such as generally less than 90 about degrees. The lower shoulder 26 may also be located at an angle B from the lower course 22 (FIG. 3).

Figure 5:
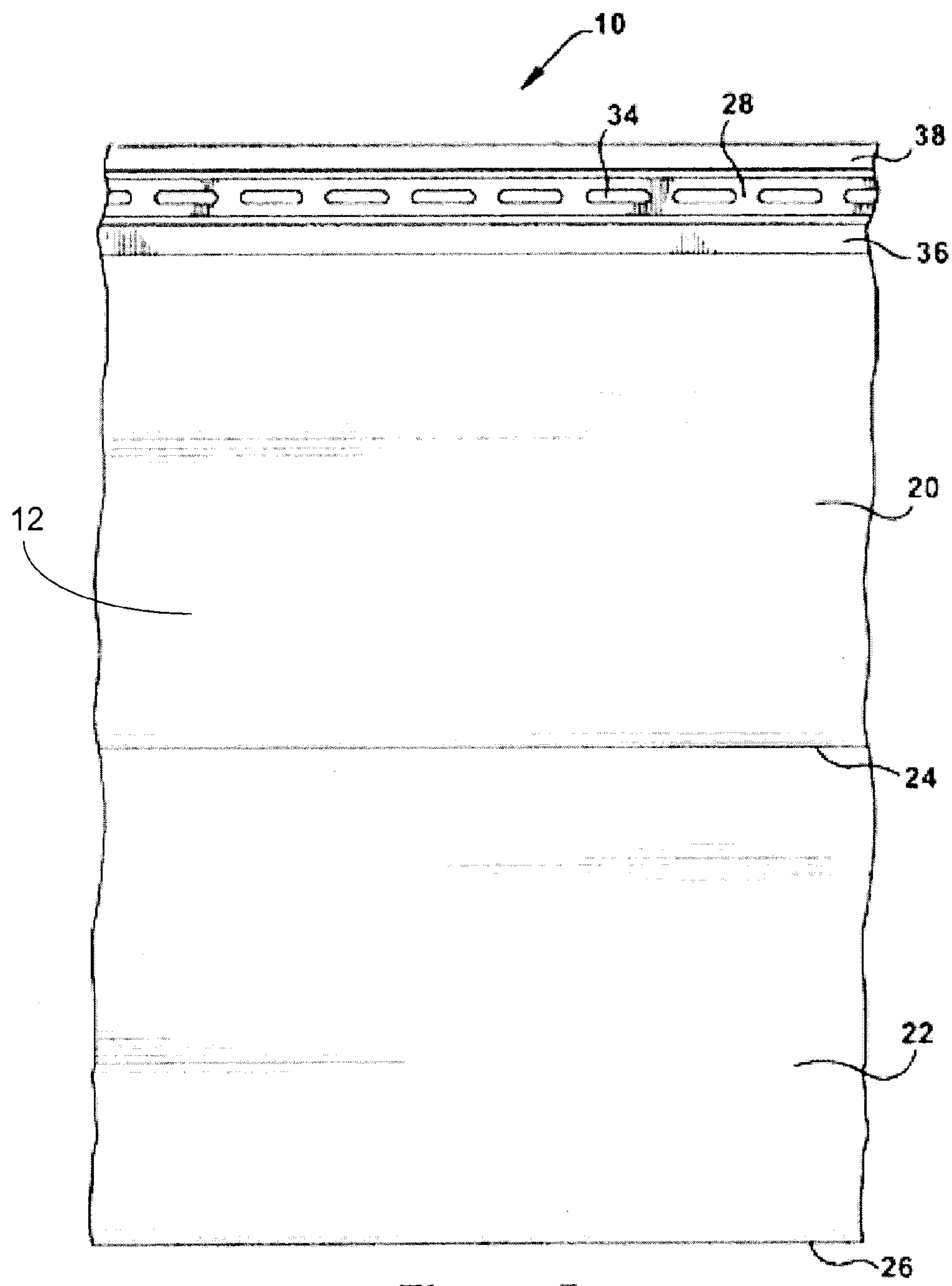
FIG. 5 illustrates a front view of the siding member of FIG. 1.

The attachment channel 28 may be of any appropriate configuration, shape or size, such as a generally rectangular or square shape (FIGS. 3-5). The attachment channel 28 may also be planar or curved in shape. The attachment channel 28 may be located at any appropriate position on the siding panel 12. For example, the attachment channel 28 may be located adjacent to the upper course 20. The attachment channel 28 may be located between the planar section 36 of the upper course 20 and a front section 38 (FIGS. 2-4). The attachment channel 28 may be slightly recessed. For example, the planar section 36 and the front section 38 may extend slightly outward from and provide a general boundary for the attachment channel 28 (FIGS. 2-4). The front section 38 may be of any appropriate shape or size, such as a generally rectangular or square shape.

The siding member 10 may be secured to the structure by any appropriate means, such as by fastening or nailing a fastener or nail (not shown) into and through the attachment channel 28 and into the structure. For example, the attachment channel 28 may include one or more attachment apertures 34 through which the fastener or nail may be located through (FIGS. 4 and 5). The attachment apertures 34 may be of any appropriate shape or size, such as of a generally rectangular, ovular, circular or slotted shape. The attachment apertures 34 may be located at any appropriate position on the attachment channel 28 such as equidistantly spaced between either end of the siding panel 12 (FIGS. 4 and 5).

The siding panel 12 may also include an interlocking feature (FIGS. 1-4). The interlocking feature may include a tongue 30 and a groove 32. While the siding panel 12 may be described as utilizing a tongue 30 and a groove 32, it is to be understood that any appropriate type of interlocking mechanism may be utilized and should not be limited to that shown and described herein. For example, the interlocking feature may include panel endcaps (not shown) or the like, that may also allow the siding member to be easily engaged with or be interlocked with another siding member to provide for better and more uniform insulation.

The tongue 30 may be of any appropriate shape or size, such as a generally slotted shape, V-shaped, U-shaped or the like. The tongue 30 may be located at any appropriate position on the siding panel 12, such as adjacent the lower course 22. While described as generally U-shaped, the tongue 30 may have any appropriate amount of space between its sides, such as virtually no space located between its sides (FIG. 3). The tongue 30 may have any appropriate radii of curvature, such as a continuous radii of curvature at its bottom.

The groove 32 may be of any appropriate shape or size, such as a generally slotted shape, rectangular shape, V-shape or the like (FIGS. 2 and 3). For example, the groove 32 may be a generally U-shaped channel that may face and be curved upward. The groove 32 may be located at any appropriate position on the siding panel 12, such as adjacent the upper course 20. While described as generally U-shaped, the groove 32 may have any appropriate amount of space between its sides, such that it may be wide enough to fit the tongue 30 within it (FIG. 2). The groove 32 may have any appropriate radii of curvature, such as having two distinct radii located at either corner or have a continuous radii of curvature at its bottom.

While described with the groove 32 being located towards the top and the tongue 30 being located towards the bottom of the siding panel 12, it is to be understood that the reverse configuration may also apply (i.e., tongue on bottom, groove on top, etc.). In addition, the tongue 30 and groove 32 may provide for a snap fit configuration, whereby the tongue 30 and groove 32 may frictionally engage one another. The tongue 30 and groove 32 may also provide for a looser fit, whereby the tongue 30 and groove 32 may provide for an alignment mechanism. The interlocking tongue 30 and groove 32 feature of the panel 12 may provide for less expansion and/or contraction of the panels 12.

The siding panel 12 may also include an upper lip 40 and a lower slot 42 (FIGS. 2-4). The groove 32 may be interconnected with an inboard concave upper lip 40 that may be open towards or face vertically downward. The upper lip 40 may be of any appropriate shape or size, such as a generally rectangular shape, upside down U-shape or the like. The upper lip 40 may be located at any appropriate position on the siding panel 12, such as adjacent the upper course 20 and the groove 32. The upper lip 40 may have any appropriate radii of curvature, such as having two distinct radii located at either corner or have a continuous radii of curvature at its top.

The siding panel 12 may include an upper surface 44 (FIGS. 2-4). The upper surface 44 may be of any appropriate shape or size, such as a generally planar rectangular shape. The upper surface 44 may be located at any appropriate position on the siding panel 12, such as towards the top of the siding panel 12 and near the upper course 20. For example, the upper surface 44 may be located adjacent to the groove 32, whereby the groove 32 may be located between the upper lip 40 and the upper surface 44.

The lower slot 42 may be of any appropriate shape or size, such as a generally rectangular shape, upside down U-shape or the like. The lower slot 42 may be located at any appropriate position on the siding panel 12, such as adjacent the lower course 22 and the tongue 30 (FIGS. 2-4). The lower slot 42 may have any appropriate radii of curvature, such as having two distinct radii located at either corner or have a continuous radii of curvature at its top.

The siding panel 12 may include a lower surface 46 (FIGS. 2-4). The lower surface 46 may be of any appropriate shape or size, such as a generally planar rectangular shape. The lower surface 46 may be located at any appropriate position on the siding panel 12, such as towards the bottom of the siding panel 12 and near the lower course 22. For example, the lower surface 46 may be located adjacent to the tongue 30, whereby the tongue 30 may be located between the lower slot 42 and the lower surface 46.

The siding panel 12 may include a rear surface 48 (FIGS. 2-4). The rear surface 48 may be of any appropriate shape or size, such as a generally planar rectangular shape. The rear surface 48 may be located at any appropriate position on the siding panel 12, such as towards the bottom of the siding panel 12 and near the lower course 22. For example, the rear surface 48 may be located adjacent to the lower slot 42, whereby the rear surface 48 may be located between the lower shoulder 26 and the lower slot 42.

The siding panels 12 and, thus, the siding members 10 may be stackable when the interlocking configuration of the siding panel 12 is utilized (FIGS. 1 and 2). The tongue 30 may be inserted into the groove 32. Once the tongue 30 is fully inserted into the groove 32, the upper lip 40 and upper surface 44 of a first siding panel 12 may abut the lower slot 42 and lower surface 46 of a second panel 12, respectively. In addition, once the tongue 30 is located within the groove 32, the planar section 36 and the front section 38 of the first panel 12 may abut the rear surface of the second panel 12.

After the siding members 10 are interlocked together in a stacked configuration, the attachment channel 28 may be fully covered by a second panel 12 or siding member 10 (FIGS. 1 and 2). The interlocking configuration of the siding members 10 may provide for full coverage of the attachment channel 28 that may provide for additional wind load resistance and better and more uniform insulation to the structure to be sided. The interlocking configuration may also provide for a snug fit between the siding members 10, whereby there may be less energy lost and a stronger connection to the exterior wall to be sided.

The siding panel 12 may further include a cavity 50 (FIG. 3). The cavity 50 may be of any appropriate shape or size. For example, the cavity 50 may extend between the upper surface 44 and the lower surface 46, such as at an end of the upper surface 44 and at an end of the lower surface 46, and include the entire area located within the siding panel 12 (FIG. 3). The cavity 50 may serve as a tray or receptacle during processing or fabrication of the siding member 10 (FIG. 3). The cavity 50 of the siding panel 12 may accommodate the insulation member 14 during processing and allow for the insulation member 14 to be applied and adhered directly to the siding panel 12, whereby there may be no need for any additional adhesive. The cavity 50 may also allow for the backing layer 16 to be applied directly to the insulation member 14 and thus the siding panel 12 (FIGS. 1 and 4).

The insulated siding member 10 may further include an insulation member 14 (FIGS. 1 and 4). The insulation member 14 may fill the cavity 50 of the siding panel 12. The insulation member 14 may include climate and moisture management systems. The climate and moisture management systems may be fabricated out of and utilize any appropriate type of material(s), such as thermally efficient and moisture resistant rigid cellular foam plastic. For example, the insulation member 14 may utilize polyurethane (PUR); polyisocyanurate (PIR), cellulosic fiber, fiberglass (FG), EPS, extruded polystyrene (XPS), polyolefin bubble, vacuum insulation panels (VIPs), polyurethane (PU) core, rigid board, spray and all other forms of insulation material. The insulation member 14 may utilize a mineral filled PUR foam for high heat dimensional stability or a rigid PUR foam replacing a flexible PUR adhesive.

The insulation member 14 may be of any appropriate shape or size, such as a generally similar and corresponding shape to that of the siding panel 12 profile (FIGS. 1 and 4). For example, the insulation member 14 may fill up the entire cavity 50 behind the siding panel 12 whereby the back portion of the siding panel 12 provides a tray or receptacle that allows a liquid or foam-type insulation to be fabricated directly into the siding panel 12 without leakage of the insulation (FIG. 3). This cavity 50 may act as a platform during fabrication of the siding member 10. The insulation member 14 may be located at any appropriate position on the siding member 10, such as abutted with the siding panel 12.

The insulation member 14 may also utilize a one step poured PUR foam versus a two step pre-cut EPS foam with a flexible adhesive. The insulation member 14 may be secured to the siding panel 12 by any appropriate means. For example, the insulation member 14 may be chemically bonded/adhered to the back of the siding panel 12, whereby additional separate adhesives may not be needed.

The insulated siding member 10 may provide a higher insulating quality for the structure to be sided, have a permanent chemical bond between the siding panel and the insulated layer (i.e., no adhesive may be needed), and provide an overall more rigid panel 12. By chemically bonding the insulation member 14 to the siding panel 12, the siding member 10 may prevent adhesion failure by removing the requirement for a mechanical bond. In addition, dimensional stability (i.e., flatness, rigidity—strength to weight, and heat distortion—lower expansion and contraction), may be provided, and may be further enhanced by fiberglass reinforcement of the siding panel 12.

The siding member 10 may provide for an easy and consistent application method or process by utilizing a PUR or PIR insulating chemical for the insulation member 14 that may improve the members 14 performance properties. For example, the insulation member 14 may provide for better overall foamed member 14 coverage, whereby there may be no gaps between the siding panel 12 and the insulation member 14 (FIG. 1). There may also be a better overall foam bond to the siding panel 12. The improved physical bonding provides for better overall foam coverage. In addition, there may be higher initial and aged foam or insulation R-values and higher initial and aged foam or insulation adhesion to panels.

The backing or film layer 16 may be fabricated out of any appropriate type of material that may provide a vapor barrier. For example, the backing 16 may utilize semipermiable film, high-density polyethylene (HDPE), aluminum, paper and all other forms of vapor barrier backing HDPE is a polyethylene thermoplastic made from petroleum.

The backing layer 16 may be of any appropriate shape or size, such as a generally thin film layer. The backing layer 16 may be located at any appropriate position on the siding member 10, such as on the insulation member 14, whereby the backing layer 16 may cover the entire surface area of the exposed area of the insulation member 14, such that the backing layer 16 may act as a HDPE panel wrap (FIGS. 1 and 4), such as a TYVEK wrap manufactured by DuPont or WEATHERMATE manufactured by Dow. Since the individual siding members 10 may already be wrapped with HDPE backing 16, the structure to be sided may not have to be separately wrapped prior to siding. The insulation member 14 and the HDPE composite backing 16 may inherently contain moisture reduction capability.

The backing layer 16 may be secured to the insulation member 14 by any appropriate means, such as with adhesives. The backing layer 16 may be self adhesive, whereby a separate flexible adhesive is not required. Utilizing a self adhesive backing layer may prevent the PUR foam insulation member 14 from delaminating. The HDPE backing layer 16 may provide a moisture vapor barrier whereby it may control moisture retention and form a complete vapor barrier seal.

To install the siding members 10, the tongue 30 of a first siding member 10 may be inserted into the groove 32 of a second siding member 10 (FIG. 2). This process may be repeated until the desired amount of siding members 10 have been installed onto the exterior of the structure. The interlocking tongue 30 and groove 32 configuration provides for ease of assembly and installation of the siding members 10. The interlocking configuration may permit the siding members 10 to be easily stackable. The stackable nature of the siding members 10 may conceal the fastening or attachment channel 28 located on the siding panel 12 to provide for an improved aesthetic appearance of the siding members 10.

During fabrication of the siding member 10, the extruded composite siding panel 12 may be backfilled with a rigid material or insulation member 14, such as PUR/PIR foam. A HDPE backing film 16 may cover the PUR/PIR foamed member 14 back. The HDPE film 16 may serve as an interlayer between the insulation member 14 and the building exterior.

PUR and PIR insulation may be highly effective and lightweight. When PUR and PIR are manufactured they have the ability to bond to most materials, such as the siding panel 12. PUR/PIR have excellent thermal conductivity, high strength to weight ratio, and manufacturing versatility.

Rigid PUR insulation products may be made by reacting a liquid polyol component with a liquid isocyanate, Methylene Diphenyl di-Isocyanate (MDI) or liquid polymeric isocyanate, polymeric Methylene Diphenyl di-Isocyanate (pMDI), in the presence of a blowing agent and other additives. The mixed components then react exothermally to form a rigid thermoset polymer. During this exothermic reaction a rigid closed cell low density insulation product is created. Excellent insulation is achieved because the gas trapped within the closed cell structures have a very low thermal conductivity, where minimal heat conduction through the cell walls occurs.

Rigid PIR differs from PUR in that it may be produced using an excess of the isocyanate component mixed with the polyol component in the presence of an appropriate catalyst. The excess isocyanate reacts with itself to form isocyanurate, which is characterized by greater heat stability. The resultant PIR insulation products may exhibit increased fire performance, reduced combustibility and higher working temperature limits compared to PUR. When incorporated into building products, PIR can meet some of the most demanding fire performance requirements.

The PUR/PIR insulation member 14 may be a highly efficient residential thermal insulation solution. The physical properties of the insulated member 14 may include an R8 insulation factor, a Class A FR rating, controlled moisture retention, higher wind load properties when compared to current industry standards, sound attenuation/deadening properties, superior dimensional stability—lower expansion and contraction, improved flatness, rigidity, resistance to heat distortion, and the like. In addition, alternatives such as EPS, XPS, FG Batt, cellulosic fiber, fiberglass, polyolefin bubble, VIPs, PU core rigid board, insulation spray foam and all other forms of insulation material may be employed.

The R value or R-value is a measure of thermal resistance used in the building and construction industry. Under uniform conditions, it is the ratio of the temperature difference across an insulator and the heat flux (heat flow per unit area) through it. The bigger the number, the better the building insulation's effectiveness.

The embodiments of the invention have been described above and, obviously, modifications and alternations will occur to others upon reading and understanding this specification. The claims as follows are intended to include all modifications and alterations insofar as they come within the scope of the claims or the equivalent thereof.

What is claimed is:

1. An insulated siding member for covering an exterior of a structure, said insulated siding member comprising:

a siding panel having an attachment channel and a back portion, wherein said back portion is generally shaped to provide a receptacle capable of retaining a liquid material;

a monolithic interlocking configuration located on said siding panel, said interlocking configuration comprising:

a tongue located at a first end of said siding panel;

a groove located at a second end of said siding panel, wherein said groove is of a shape and size to fit said tongue therein;

an upper lip located on a side of said groove;

an upper surface located on a side of said groove opposite said upper lip;

a lower slot located on a side of said tongue;

a lower surface located on a side of said tongue opposite said lower slot, wherein said lower slot and said lower surface extend a length outward from said tongue;

an insulation material held in said receptacle generally filling said receptacle; and a vapor barrier secured with the insulation member, wherein the vapor barrier is capable of being positioned adjacent the insulation member and the exterior of the structure.

2. The siding member of claim 1, wherein said interlocking configuration permits said siding member to be stacked upon and interlocked with a second siding member having a second interlocking configuration substantially identical to said interlocking configuration.

3. The siding member of claim 2, wherein said tongue of said interlocking configuration is capable of aligning with a groove of said second interlocking configuration and capable of providing a frictional fit therebetween.

4. The siding member of claim 3, wherein said attachment channel is recessed and located between a planar section and a front section.

5. The siding member of claim 4, wherein said attachment channel includes at least one attachment aperture for securing said siding panel to the exterior of the structure.

6. The siding member of claim 1, wherein an end of said upper surface is generally aligned with an end of said lower surface thereby forming said receptacle.

7. The siding member of claim 4 further comprising a rear surface, wherein said rear surface is capable of abutting a planar section and a front section of said second siding member.

8. The siding member of claim 3, wherein said upper lip and said upper surface are generally planar.

9. The siding member of claim 8, wherein said lower slot and said lower surface are generally planar.

10. The siding member of claim 9, wherein said lower slot of said interlocking configuration is capable of abutting an upper lip of said second interlocking configuration.

11. An insulated siding member for covering an exterior of a structure, said insulated siding member comprising:

a siding panel having a monolithic interlocking configuration, an upper surface and a lower surface, wherein said siding panel is formed from a first material;

a cavity located within said siding panel and extending between said upper surface and said lower surface;

wherein said cavity is capable of serving as a molding receptacle during processing to allow liquid insulating material to be generally held with said cavity;

an insulation member defined by and secured within said cavity of said siding panel; and a vapor barrier secured with the insulation member, said vapor barrier formed from a second material, wherein the vapor barrier is capable of being positioned adjacent the insulation member and the exterior of the structure and wherein said first material is different from said second material.

12. The siding member of claim 11, wherein said cavity accommodates said insulation member during processing and allows said insulation member to be applied directly to said siding panel.

13. The siding member of claim 11, wherein said insulation member is secured to said siding panel via a chemical bond.

14. The siding member of claim 13, wherein said insulation member comprises a polyurethane or a polyisocyanurate foam.

15. The siding member of claim 11, wherein said second material vapor comprises a self adhesive material.

16. The siding member of claim 15, wherein said second material comprises high-density polyethylene.

17. An insulated siding member comprising:

a siding panel having a front facing and a monolithic interlocking configuration, said siding panel being formed from a first material, wherein said siding panel includes a cavity located on a back side thereof, wherein said cavity is generally closed on at least three sides and forms a molding receptacle to allow liquid insulating material to be inserted into and generally held within said cavity;

an insulation member secured to said siding panel; and a vapor barrier secured to said insulation member formed from a second material, wherein the vapor barrier is capable of being positioned adjacent the insulation member and an exterior of a building structure and wherein said first material is different from said second material.

18. The insulated siding member of claim 1, wherein said second material is high-density polyethylene.

19. The insulated siding member of claim 17, wherein said siding panel is free of a rear facing.

20. The insulated siding member of claim 17, wherein said second material is high-density polyethylene.

21. The insulated siding member of claim 11, wherein said second material is high-density polyethylene.

* * * * *